(12) United States Patent
Hauger et al.

(10) Patent No.: US 12,502,061 B2
(45) Date of Patent: Dec. 23, 2025

(54) ILLUMINATION APPARATUS, ILLUMINATION METHOD, ILLUMINATION SYSTEM AND METHOD FOR OPERATING AN ILLUMINATION SYSTEM

(71) Applicant: Carl Zeiss Meditec AG, Jena (DE)

(72) Inventors: Christoph Hauger, Aalen (DE); Thorsten Tritschler, Aalen (DE)

(73) Assignee: Carl Zeiss Meditec AG, Jena (DE)

(*) Notice: Subject to any disclaimer, the term of this patent is extended or adjusted under 35 U.S.C. 154(b) by 505 days.

(21) Appl. No.: 17/971,537

(22) Filed: Oct. 21, 2022

(65) Prior Publication Data

US 2023/0190088 A1    Jun. 22, 2023

(30) Foreign Application Priority Data

Oct. 21, 2021  (DE) ............... 10 2021 211 859.3

(51) Int. Cl.
  *A61B 3/00*  (2006.01)
  *A61B 3/12*  (2006.01)
  *A61B 3/14*  (2006.01)
  *G02B 26/08*  (2006.01)
(52) U.S. Cl.
  CPC .......... *A61B 3/0008* (2013.01); *A61B 3/1225* (2013.01); *A61B 3/14* (2013.01); *G02B 26/0833* (2013.01)
(58) Field of Classification Search
  CPC ....... A61B 3/0008; A61B 3/1225; A61B 3/14; G02B 26/0833
  USPC ....................................................... 351/206
  See application file for complete search history.

(56) References Cited

U.S. PATENT DOCUMENTS

| 11,045,254 B2 | 6/2021 | Scheller et al. |
| 2012/0203075 A1* | 8/2012 | Horvath ............... A61B 90/30 600/249 |
| 2012/0215155 A1* | 8/2012 | Muller ............... A61F 9/0079 604/20 |

(Continued)

FOREIGN PATENT DOCUMENTS

| DE | 102014012631 A1 | 2/2016 |
| EP | 3799777 A1 | 4/2021 |
| WO | 2021134087 A1 | 7/2021 |

OTHER PUBLICATIONS

Office Action issued in German Patent Application No. DE 10 2021 211 859.3, dated Aug. 3, 2022 (from which this application claims priority) and English language translation thereof.

*Primary Examiner* — Sharrief I Broome
(74) *Attorney, Agent, or Firm* — Ewers IP Law PLLC; Falk Ewers

(57) ABSTRACT

An illumination apparatus for illuminating an examination object, in particular for illuminating a fundus section of a patient's eye, includes at least one light source which emits light onto a micromirror actuator, which is controllable by a control device for the purpose of preshaping the wavefront reflected by the micromirror actuator, and at least one light guide configured to guide the reflected light of the light source that has been preshaped by the micromirror actuator to an examination object. The light guide includes a first end for coupling light into the light guide and a second end for coupling light out of the light guide. In addition, an illumination method, and also an illumination system and a method for operating an illumination system are provided.

15 Claims, 4 Drawing Sheets

(56) References Cited

U.S. PATENT DOCUMENTS

2013/0144278 A1\* 6/2013 Papac ................. A61F 9/00821
606/4
2018/0164574 A1\* 6/2018 Wang ................... H04N 13/271
2018/0214018 A1\* 8/2018 Dos Santos ........ G02B 23/2469

\* cited by examiner

ILLUMINATION APPARATUS, ILLUMINATION METHOD, ILLUMINATION SYSTEM AND METHOD FOR OPERATING AN ILLUMINATION SYSTEM

CROSS REFERENCE TO RELATED APPLICATIONS

This application claims priority to German patent application DE 10 2021 211 859.3, filed Oct. 21, 2021, the entire content of which is incorporated herein by reference.

TECHNICAL FIELD

The disclosure relates to an illumination apparatus and to an illumination method. In addition, the disclosure also relates to an illumination system and a method for operating an illumination system.

BACKGROUND

The treatment of retinal detachments—referred to as ablatio retinae or else amotio retinae—certainly constitutes one of the ophthalmological emergencies, treatment of which can prevent the patient from becoming blind. Particularly, if there is only a small tear in the retina or only a partial retinal detachment, the upper layer of the retina can be reattached to the lower layer with photocoagulation, i.e., by the targeted irradiation of the defect with laser light. By virtue of the periphery of the defect being irradiated by the laser, this gives rise to local scarring at the fundus of the eye, which fixedly reattaches the retina to the fundus of the eye and thus effectively blocks the risk of enlargement of the defect.

What has proved to be problematic in this case, however, is that for the illumination of the fundus of the eye before and during this procedure but in particular for the targeted irradiation of the defect at the fundus of the eye by targeted irradiation with laser light, one or else a plurality of probes must be inserted into the eye with trocars in order, firstly, to achieve illumination of the fundus of the eye and, secondly, to enable the laser to be guided to the defect. In order to enable minimally invasive interventions to an increased extent in this case, in fundus surgery the diameters of the surgical instruments used have been continuously reduced in recent years. Surgical instruments with light guides which have a diameter of just 25 gauge or 27 gauge are currently used. As the diameter decreases, however, the intraoperative alignment of these surgical instruments by the user has proved to be problematic. In the case of the known solutions, this can usually be realized by way of complex mechanical constructions which can be used to alter the alignment of the light guide that guides the light to the eye, but this has been found to be slow, not very intuitive and limited to a small number of predefined settings. Consequently, during the operation the user is forced to alter the position of the probes manually, which of course is detrimental to precision.

U.S. Pat. No. 11,045,254 B2 describes an apparatus in which it is possible, by way of a mechanically very complex construction, to alter the curvature of a light guide in such a way that the latter can guide laser light in different directions. This has proved to be disadvantageous, however, since, besides a complex mechanical construction, the mechanism provided for this only enables a very imprecise adjustment.

SUMMARY

Therefore, it is an object of the present disclosure to reduce the abovementioned disadvantages and to provide an illumination apparatus which is adjustable precisely and as simply as possible. In addition, it is an object of the disclosure to provide an improved illumination method, and also an improved illumination system, and a method for operating an illumination system.

The object concerning the illumination apparatus is achieved according to an aspect of the disclosure with an illumination apparatus for illuminating an examination object, in particular for illuminating a fundus section of a patient's eye, including at least one light source which emits light onto a micromirror actuator, which is controllable by a control device for the purpose of preshaping the wavefront reflected by the micromirror actuator, and including at least one light guide for guiding the reflected light of the light source that has been preshaped by the micromirror actuator to an examination object, the light guide including a first end for coupling light into the light guide and a second end for coupling light out of the light guide.

With the micromirror actuator—often also referred to as digital micromirror device (DMD)—the wavefront of the light that comes from the light source and is reflected by the micromirror actuator can be preshaped in a targeted manner. As a result, ultimately the properties of the light that is coupled out again from the second end of the light guide can be adapted in a targeted manner. In this case, the micromirror has a multiplicity of individual mirror elements which can be individually controlled by the control device.

In this context, it has also proved to be particularly advantageous if the micromirror actuator is controllable by the control device in such a way that the number of light spots, the spot size, the focus, the light intensity, the aperture and/or the position of the light spot are/is settable by way of the preshaping of the wavefront of the light of the light source reflected by the micromirror actuator. This makes it possible, firstly, to achieve an areal illumination of the examination object by way of the preshaping of the wavefront reflected by the micromirror actuator, which illumination can be adapted to the respective situation by the user. In this regard, for example—without the light guide having to be moved—the position of the light spot and the size thereof can be altered in a continuously variable manner. The light that is coupled out of the second end of the light guide in this case emerges from the light guide here in a conical fashion. Moreover, it is also possible by this means, namely by way of focusing of the light, not only to achieve an areal illumination of the examination object, but also to achieve a targeted irradiation of the examination object with focused, high-energy light, with which defects at the retina can be irradiated, for example. In other words, the illumination apparatus can be operated in a first operating mode, in which an areal illumination of the examination object is possible, and in a second operating mode, in which a locally very delimited and defined irradiation of the examination object with high-energy light is possible. In the context of the disclosure, in the case of the areal illumination—that is to say in the first operating mode—provision is made in particular for the light spot to have a diameter of a plurality of millimeters, particularly typically a diameter of 5 mm with tolerances of +5 mm/−2 mm. In this case, customary working distances between the second end of the light guide and the examination object are in the range of 15 mm+/−5 mm.

Moreover, it has proved to be worthwhile if an operating element is provided for actuating the control device that controls the micromirror actuator. This makes it possible for the user, in a targeted manner, to predefine the shape and the type of the illumination. In particular, in this case it is possible to provide predefined operating modes and/or illumination forms and shapes, which the user can select. In addition, it is thereby possible for the user to alter the position of the light cone or of the focused light spot in a targeted manner. Alternatively and/or supplementarily, however, in the context of the disclosure provision is also made for the change between the operating modes for example also to be effected in an automated manner. In this case, the operating element can be mounted in direct proximity to the micromirror actuator. Alternatively or supplementarily, however, the operating element can also be arranged at a central operating unit. In this case, the operating element can be embodied as a pushbutton and/or as a digital solution, for example as a touchscreen. Moreover, the operating element can be realized as a voice control facility.

It has also proved to be advantageous if the light source is embodied as a laser, particularly typically as an RGB laser. Particularly with the use of an RGB laser, it is possible to achieve a uniform areal illumination of the examination object which enables an improved assessment of the examination object. In addition, with the use of the RGB laser, it is also possible to obtain a targeted irradiation of the examination object with a defined energy input by virtue of only the green portion of the RGB laser being used, for example, in order to irradiate the examination object with the laser light—then focused by the micromirror actuator.

It has also been found to be advantageous if the light guide is formed as a multimode light guide. The use of multimode light guides makes it possible in particular to attain smaller diameters and lower costs. Moreover, the transfer of the wavefront that has been preshaped by the micromirror actuator to the examination object is realized particularly simply by way of the multimode light guide.

It has proved to be particularly advantageous for the application if the illumination apparatus is at least partly integrated in a surgical instrument, typically in an ophthalmosurgical instrument. In particular, in this case, the micromirror actuator and/or the control device thereof can be integrated in the surgical instrument. Moreover, in the context of the disclosure, provision is also made for the light source likewise to be arranged in the surgical instrument. Alternatively, however, the light source can be coupled to the micromirror actuator via a light feed guide such that the light of the light source is directed onto the micromirror actuator. Moreover, the operating element can also be arranged on the surgical instrument, thereby directly enabling the user to directly operate the control device and thus ultimately also the micromirror actuator in order for example to change the position of the light spot and/or the focus thereof or the size thereof.

The object concerning the illumination method is achieved according to an aspect of the disclosure with a method including the following steps:

emitting light from a light source in the direction of a micromirror actuator, preshaping the wavefront of the light reflected by the micromirror actuator, coupling the light reflected by the micromirror actuator into a first end of the light guide, and coupling the preshaped light out of the light guide in order to illuminate the examination object.

In other words, the wavefront of the light originating from the light source is preshaped by the micromirror actuator and coupled into the light guide and is guided by the light guide to the examination object, at which it is then coupled out again from the second end and impinges on the examination object.

In this case, too, it has proved to be particularly advantageous if the number of light spots, the spot size, the focus, the light intensity, the aperture and/or the position of the light spot are/is set. As a result, the user can adapt the light emerging from the second end of the light guide to the respective requirements and, in particular, besides a pure areal illumination, can also achieve a targeted punctiform irradiation of the examination object with light having a defined energy. The illumination method thus makes it possible to operate the illumination apparatus optionally and switchably in a first operating mode used for areally illuminating the examination object, and a second operating mode enabling a pinpoint local irradiation of the examination object with high-energy light—for example with laser light.

It has also proved to be particularly advantageous if the position of the light spot follows the position of a second instrument. This ensures that the illumination is always directed at the tip of the second instrument, for example, and follows the tip when the second instrument is moved by the user, for example during a surgery. This therefore always ensures optimal illumination of the examination object—the surgical area. For the detection of the position of the second instrument, in a typical manner, an image capture device, such as a camera or a stereo camera, can be used. Alternatively, however, it is also provided that the image capture device is implemented as an intraoperative optical coherence tomography (iOCT) system. From the images captured by the image capture device, both the position of the second instrument and the position or orientation of the light spot can be detected, for example with feature recognition, which is basically known to a person of ordinary skill in the art. In addition, however, it is also possible to detect structures of the surgical area, for example structures of the retina, and to use this information for determining the position and/or the orientation of the instrument and the light spot. For this purpose, the position and/or the orientation of the second instrument in relation to the structures within the retina of the eye can be detected—for example, with iOCT or a camera—and at the same time, with a combination of an illumination device according to an aspect of the disclosure and a detector, the illumination device can be used as an imaging device, in that the light from the light source is rastered two-dimensionally over the surface of the object under examination and the scattered and/or reflected light from each point is detected with the detector. This will be explained further below with reference to the third operating mode of the illumination system. Here, too, structures of the surgical area can be detected and compared with those captured by the image capture device, whereby the position of the light spot of the illumination device can be adjusted such that its center coincides with the center of the second instrument.

The object concerning the illumination system is achieved according to an aspect of the disclosure with an illumination system including an illumination apparatus. At least one light guide has a third end for coupling light that has been reflected or scattered at an examination object into the at least one light guide. A detector for capturing at least part of the reflected or scattered light is coupled to the at least one light guide. A control device is embodied in such a way that the micromirror actuator is adjustable between at least two operating modes selected from a group including a first operating mode enabling illumination of an examination object, a second operating mode enabling targeted laser irradiation of an examination object, and a third operating mode enabling image capture of the examination object. In this case, the detector is typically embodied as a photodetector.

As already described above with reference to the illumination apparatus, it is possible to use the illumination system—in the first operating mode—for areally illuminating an examination object, while in the second operating mode it is possible to irradiate the examination object in a focused manner—that is to say in a locally delimited manner—and with high-energy light in a highly defined manner. Moreover, in the third operating mode, an image representation of the examination object may be generated with the light that has been scattered and/or reflected by the examination object being captured by the detector. For this purpose, in the third operating mode, provision is made for the light of the light source ultimately to be scanned over the surface of the examination object in a punctiform manner with the aid of the micromirror actuator and for the scattered and/or reflected light from each point to be captured with the detector. These pieces of information obtained from the individual points are then combined by a data processing unit to form a common image representation. In this case, this image representation is then ultimately presented on a display apparatus and enables a very accurate imaging of the examination object. In particular, said image representation makes it possible to identify critical image sections, which can then be irradiated downstream in a targeted manner in the second operating mode.

It has also proved to be advantageous if the at least one light guide is embodied as a double light guide and if the third end is arranged adjacent to the second end. This ensures that a spatial separation of the light backscattered by the examination object and the light reflected by the micromirror actuator is attained. In this case, the strand of the double light guide to which the third end is allocated is coupled to the detector. In the context of the disclosure, however, provision is also made for just one light guide to be provided and for a beam splitter additionally to be used, with the aid of which the backscattered or reflected light is coupled out of the light guide and passed to the detector.

The object concerning the method for operating an illumination system is achieved according to an aspect of the disclosure with the following steps:
  operating an illumination system in an operating mode selected from a group including a first operating mode enabling illumination of an examination object, a second operating mode enabling targeted laser irradiation of an examination object, and a third operating mode enabling image capture of the examination object, and
  providing the possibility of switching between the individual operating modes.

As a result, a method is thus provided which makes it possible to operate the illumination system in one operating mode or in a plurality of operating modes, between which the user can switch or change over. In this case, provision is made, in particular, for the switching between the individual operating modes to be effected in an automated manner. In this regard, for example, provision can thus be made for the illumination system—if the illumination system is being operated in the second operating mode, in which the main emphasis is thus on a targeted focused irradiation of the examination object—to be automatically switched, after a predefined time duration, from the second operating mode to the first operating mode, in which the examination object is illuminated.

It has also proved to be advantageous if the method additionally includes the following steps:
  creating an image representation of the examination object by operating the illumination system in the third operating mode,
  feeding the image representation of the examination object to a data processing unit and capturing critical image sections, and
  operating the illumination system in the second operating mode and irradiating the critical image sections with the light of the light source.

As a result, it is thus possible, in the third operating mode, firstly to capture critical image sections in a targeted manner and then to locally irradiate them downstream in the second operating mode. In this case, the individual steps can be repeated in order to be able to evaluate the progress of the irradiation of the examination object. In this case, the irradiation of the examination object in the second operating mode can include in particular the simultaneous or progressive irradiation of individual points arranged in the periphery of the critical image sections.

BRIEF DESCRIPTION OF THE DRAWINGS

The disclosure will now be described with reference to the drawings wherein.

DESCRIPTION OF EXEMPLARY EMBODIMENTS

Figure 1:
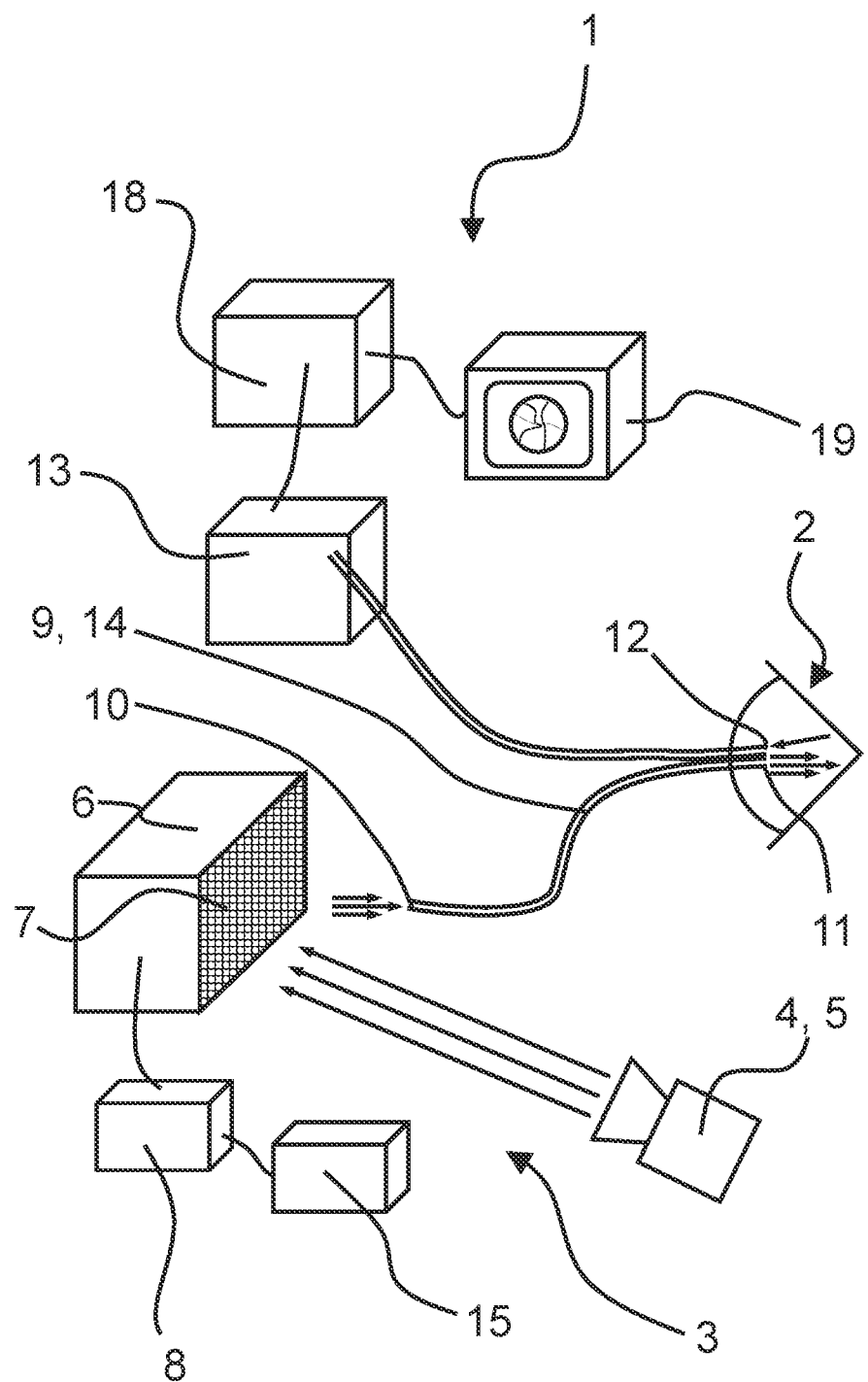
FIG. 1 shows a schematic view of an illumination system according to an exemplary embodiment of the disclosure.

FIG. 1 shows, in a schematic view, an illumination system 1 according to an exemplary embodiment of the disclosure for illuminating an examination object 2, which is illustrated as an eye in the exemplary embodiment shown. In this case, the illumination system 1 includes an illumination apparatus 3 for illuminating the examination object 2. In this case, the illumination apparatus 3 includes a light source 4, which is formed as a laser 5, more specifically as an RGB laser 5, in the exemplary embodiment shown. In this case, the RGB laser 5 optionally emits white light or alternatively only light having a specific wavelength, or in a narrow waveband, green light in the present example. In this case, the light of the light source 4 embodied as a laser 5 impinges on a micromirror actuator 6, the individual mirror elements 7 of which are controllable by a control device 8 in order to preshape the wavefront of the light reflected by the micromirror actuator 6. As a result, it is possible to set the number of light spots, the spot size, the focus, the light intensity, the aperture and the position of the light spot, whereby ultimately different illumination scenarios can be realized, as will be explained even further below. The illumination apparatus 3 additionally includes a light guide 9, by which the reflected light of the light source 4 that has been preshaped by the micromirror actuator 6 is guided to the examination object 2. In this case, the light guide 9, which is embodied as a multimode light guide 9 in the exemplary embodiment shown, has a first end 10 used for coupling light into the light guide 9, and a second end 11, from which the light is coupled out again. In this case, the light guide 9 used in the exemplary embodiment shown is embodied as a double light guide 14 having—adjacent to the second end 11—a third end 12. Said third end 12 serves for coupling light that is reflected or scattered at the examination object 2 into the light guide 9. In the case of the exemplary embodiment of the illumination system 1 as illustrated in FIG. 1, this light that is coupled in at the third end 12 is guided to a detector 13, which captures at least part of the reflected or scattered light. In this case, the control device 8 of the illumination apparatus 3, which control device 8 can be used to control the micromirror actuator 6, can adjust the micromirror actuator 6 between a total of three operating modes. In a first operating mode, the micromirror actuator 6 is controlled in such a way that the light coupled out of the second end 11 of the light guide 9 forms a light cone used for the areal illumination of the examination object 2. In a second light mode, the wavefront of the light reflected by the micromirror actuator 6 is preshaped by the latter in such a way that the light coupled out of the second end 11 of the light guide 9 is focused at a point on the surface of the examination object 2. While the RGB laser 5 is used as the light source 4 in the first operating mode, in the second operating mode only light having a specific wavelength is emitted by the light source 4, which light is focused on the examination object 2 by the micromirror actuator 6. In the third operating mode, which ultimately serves for imaging the examination object 2, light having a very narrow wavelength range is likewise emitted by the light source 4. This light impinges on the micromirror actuator 6, where its wavefront is preshaped in such a way that the reflected light continuously scans over the surface of the examination object 2, that is to say successively irradiates the individual points which are intended to be imaged. The light backscattered by the irradiated region is then coupled into the third end 12 of the light guide 9 and guided to the detector 13, which uses the scattered light from the individual points of the examination object 2 that have been illuminated in scanning fashion to create an image representation of the examination object 2, the number of scanned points on the surface of the examination object 2 defining the resolution of the image representation. Said image representation is then presented on a display apparatus 19 with a data processing unit 18. As can be gathered from FIG. 1, the light guide 9 is embodied as a double light guide 14, in which the third end 12 is arranged adjacent to the second end 11. FIG. 1 additionally indicates merely schematically an operating element 15, with the aid of which the control device 8 can be actuated in order to be able to adjust the micromirror actuator 6 between the individual operating modes or for example to be able to manually change the position of the illuminated area or of the focus in the first operating mode or in the second operating mode.

Figure 2:
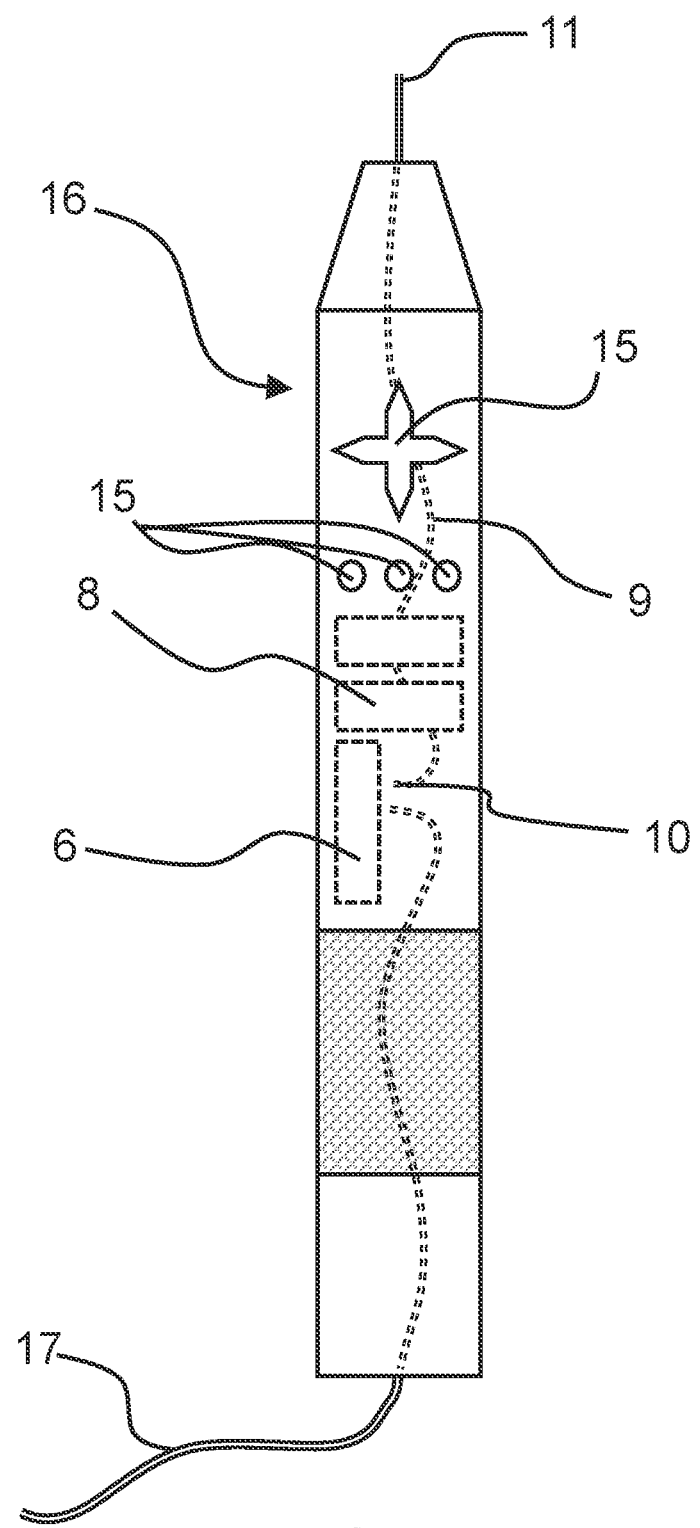
FIG. 2 shows a plan view of a surgical instrument.

FIG. 2 shows, in a plan view, a surgical instrument 16—more precisely an ophthalmosurgical instrument 16, in which part of the illumination apparatus 3 is integrated. In the case of the exemplary embodiment shown, the light source 4 is arranged outside the surgical instrument 16 and its light is guided with a light feed guide 17 to the micromirror actuator 6 arranged within the ophthalmological instrument 16. Under the control of the control device 8, the micromirror actuator 6 preshapes the wavefront of the light reflected by the micromirror actuator 6. Said light is then coupled into the first end 10 of the light guide 9 and guided by the light guide 9 from the ophthalmological instrument 16 to the examination object 2. As can furthermore be gathered from FIG. 2, a plurality of operating elements 15 are arranged on the ophthalmological instrument 16 and enable the user to operate the control device 8 and thus the micromirror actuator 6 in order for example to switch back and forth between the individual operating modes or to alter the position of the light spot and/or of the focal point in a targeted manner.

Figure 3:
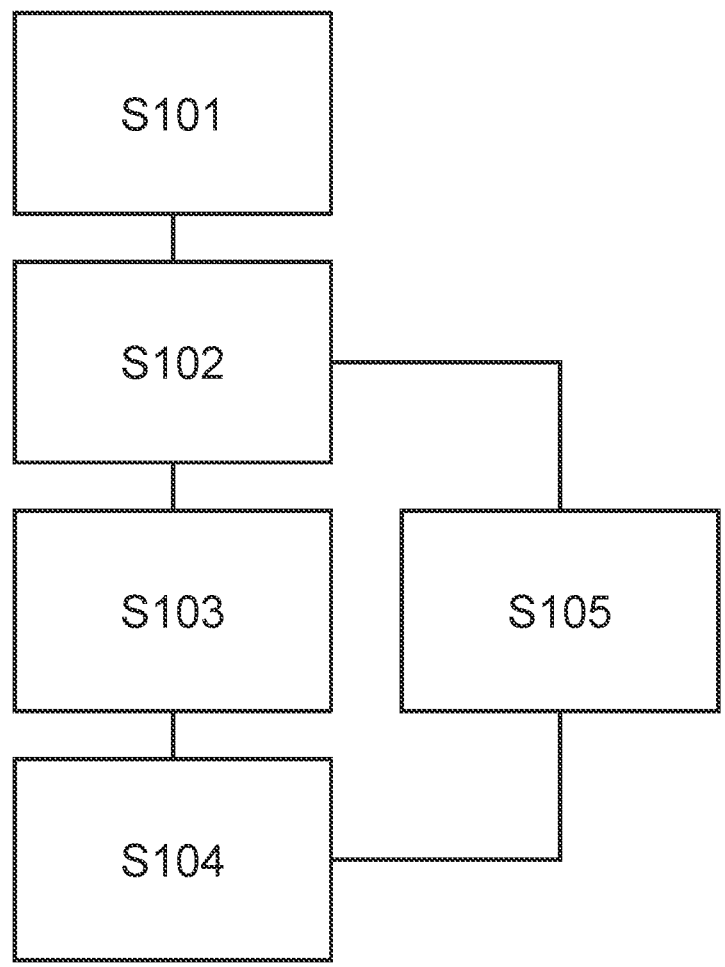
FIG. 3 shows a flowchart of a method for illuminating an examination object.

FIG. 3 shows, in a flowchart, the method according to an aspect of the disclosure for illuminating an examination object 2. In a first step S101, in this case, light from a light source 4 is emitted in the direction of a micromirror actuator 6. In a second step S102, the wavefront of the light reflected by the micromirror actuator 6 is preshaped by the micromirror actuator 6 and, in a third step S103, coupled into a first end 10 of the light guide 9. Then, in a fourth step S104, the light is coupled out again from a second end 11 of the light guide 9 and areally illuminates the examination object 2. In this case, in a step S105, the number of light spots, the spot size, the focus, the light intensity, the aperture and/or the position of the light spot can be set.

Figure 4:
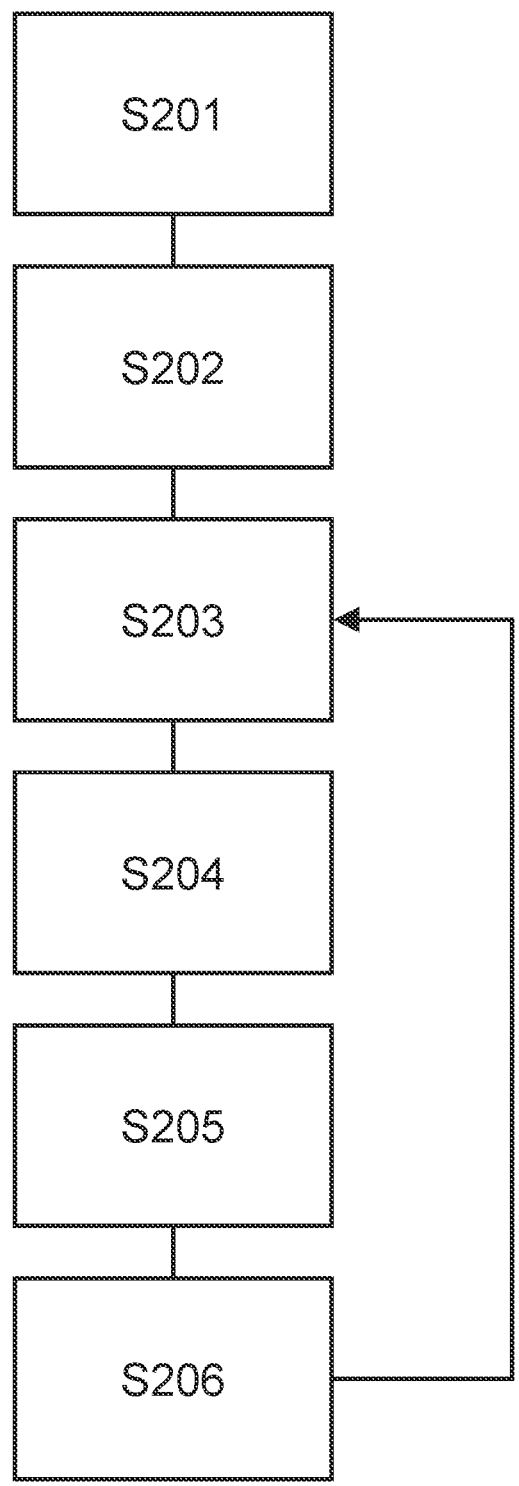
FIG. 4 shows a flowchart of a method for operating an illumination system.

FIG. 4 illustrates a flowchart of a method for operating an illumination system 1. In a step S201, the illumination system 1 is operated in an operating mode selected from a group including a first operating mode enabling illumination of an examination object 2, a second operating mode enabling targeted laser irradiation of an examination object 2, and a third operating mode enabling image capture of the examination object 2. In a step S202, the user is provided with the possibility of switching between the individual operating modes. In addition, in a step S203, an image representation of the examination object 2 is then created by the illumination system 1 being operated in the third operating mode. In a step S204, the image representation of the examination object 2 is then fed to a data processing unit 18, with the aid of which critical image sections are captured in a step S205. In a step S206, finally, the illumination system 1 is operated in the second operating mode and the critical image sections on the examination object 2 are irradiated by a light source 4. Steps S203 to S206 can be repeated until the critical image sections have all been completely irradiated in the second operating mode.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Illumination system
2 Examination object
3 Illumination apparatus
4 Light source
5 Laser
6 Micromirror actuator
7 Mirror element
8 Control device
9 Light guide
10 First end
11 Second end
12 Third end
13 Detector
14 Double light guide
15 Operating element
16 Surgical instrument
17 Light feed guide
18 Data processing unit
19 Display apparatus
S101-S102 Method steps
S201-S206 Method steps

What is claimed is:

1. An illumination system for illuminating an examination object, the illumination system comprising:
    a micromirror actuator;
    a control device;
    at least one light source configured to emit light onto the micromirror actuator, the micromirror actuator being controllable by the control device to preshape a wavefront of the light reflected by the micromirror actuator;
    at least one light guide configured to guide the reflected light of the at least one light source that has been preshaped by the micromirror actuator to the examination object, the at least one light guide including a first end for coupling the light into the at least one light guide and a second end for coupling the light out of the at least one light guide;
    the at least one light guide having a third end configured to couple the light that has been reflected or scattered at the examination object into the at least one light guide;
    a detector configured to capture at least part of the reflected or scattered light;
    the detector being coupled to the at least one light guide; and
    the control device being embodied such that the micromirror actuator is adjustable between at least two operating modes selected from the group consisting of a first operating mode enabling illumination of the examination object, a second operating mode enabling targeted laser irradiation of the examination object, and a third operating mode enabling image capture of the examination object.

2. The illumination system as claimed in claim 1, wherein the illumination system is configured to illuminate a fundus section of a patient's eye.

3. The illumination system as claimed in claim 1, wherein the micromirror actuator is controllable by the control device such that at least one of a number of light spots, a spot size, a focus, a light intensity, an aperture, and a position of the light spot are/is settable to preshape the wavefront of the light of the at least one light source reflected by the micromirror actuator.

4. The illumination system as claimed in claim 1, further comprising an operating element configured to actuate the control device which controls the micromirror actuator.

5. The illumination system as claimed in claim 1, wherein the at least one light source is a laser.

6. The illumination system as claimed in claim 1, wherein the at least one light source is an RGB laser.

7. The illumination system as claimed in claim 1, wherein the at least one light guide is configured as a multimode light guide.

8. The illumination system as claimed claim 1, wherein the micromirror actuator is integrated in a surgical instrument.

9. A method for illuminating the examination object with the illumination system as claimed in claim 1, the method comprising:
    emitting light from the at least one light source in a direction of the micromirror actuator;
    preshaping the wavefront of the light reflected by the micromirror actuator;
    coupling the light reflected by the micromirror actuator into the first end of the at least one light guide; and
    coupling the preshaped light out of the at least one light guide to illuminate the examination object.

10. The method as claimed in claim 9, further comprising:
    setting at least one of a number of light spots, a spot size, a focus, a light intensity, an aperture, and a position of the light spot.

11. The method as claimed in claim 10, wherein the position of the light spot follows a position of a second instrument.

12. The illumination system as claimed in claim 1, wherein the at least one light guide is a double light guide, and the third end thereof is arranged adjacent to the second end.

13. A method for operating the illumination system as claimed in claim 1, the method comprising:
    operating the illumination system in an operating mode selected from the group consisting of the first operating mode enabling illumination of the examination object, the second operating mode enabling targeted laser irradiation of the examination object, and the third operating mode enabling image capture of the examination object; and
    providing a possibility of switching between individual operating modes.

14. The method as claimed in claim 13, further comprising:
    creating an image representation of the examination object by operating the illumination system in the third operating mode;
    feeding the image representation of the examination object to a data processing unit and capturing critical image sections; and
    operating the illumination system in the second operating mode and irradiating the critical image sections with the at least one light source.

15. A method for illuminating the examination object with an illumination apparatus, the illumination apparatus including a micromirror actuator, a control device, at least one light source configured to emit light onto the micromirror actuator, the micromirror actuator being controllable by the control device to preshape a wavefront of the light reflected by the micromirror actuator, and at least one light guide configured to guide the reflected light of the at least one light source that has been preshaped by the micromirror actuator to the examination object, the at least one light guide including a first end for coupling the light into the at least one light guide and a second end for coupling the light out of the at least one light guide, the method comprising:
    emitting light from the at least one light source in a direction of the micromirror actuator;
    preshaping the wavefront of the light reflected by the micromirror actuator;
    coupling the light reflected by the micromirror actuator into the first end of the at least one light guide;
    coupling the preshaped light out of the at least one light guide to illuminate the examination object; and
    setting at least one of a plurality of light spots, a spot size, a focus, a light intensity, an aperture, and a position of the light spot, wherein the position of the light spot follows a position of a second instrument.

* * * * *